(12) United States Patent
Hijazi

(10) Patent No.: US 11,015,503 B2
(45) Date of Patent: May 25, 2021

(54) EXHAUST COMPONENT ASSEMBLY WITH HEATING ELEMENT AND CARVED SUBSTRATE

(71) Applicant: Faurecia Emissions Control Technologies, USA, LLC, Columbus, IN (US)

(72) Inventor: Claudinei Hijazi, Bargersville, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 16/424,672

(22) Filed: May 29, 2019

(65) Prior Publication Data

US 2020/0378289 A1    Dec. 3, 2020

(51) Int. Cl.
*F01N 3/20* (2006.01)
*B01D 53/94* (2006.01)

(52) U.S. Cl.
CPC ........... *F01N 3/2013* (2013.01); *B01D 53/94* (2013.01); *F01N 2240/16* (2013.01)

(58) Field of Classification Search
None
See application file for complete search history.

(56) References Cited

U.S. PATENT DOCUMENTS

| | | | | |
|---|---|---|---|---|
| 3,768,982 A | * | 10/1973 | Kitzner | B01J 35/02 422/174 |
| 4,523,935 A | * | 6/1985 | Takagi | B01D 39/2093 219/205 |
| 4,549,399 A | * | 10/1985 | Usui | B01D 53/944 55/283 |
| 5,271,906 A | * | 12/1993 | Yuuki | B01D 53/9481 422/171 |
| 5,827,577 A | | 12/1998 | Spencer | |
| 5,983,628 A | * | 11/1999 | Borroni-Bird | F01N 3/05 60/274 |
| 8,110,154 B2 | | 2/2012 | Roth et al. | |
| 8,394,348 B1 | | 3/2013 | Nunan et al. | |
| 9,962,652 B2 | | 5/2018 | Omiya et al. | |
| 2003/0194357 A1 | * | 10/2003 | Lancaster | B01D 53/9454 422/177 |
| 2008/0170972 A1 | * | 7/2008 | Cai | F01N 13/008 422/177 |
| 2011/0000195 A1 | * | 1/2011 | Gonze | F01N 3/027 60/286 |
| 2012/0011834 A1 | * | 1/2012 | Sobue | F01N 3/2013 60/300 |
| 2014/0041367 A1 | | 2/2014 | Balthes et al. | |
| 2017/0016370 A1 | * | 1/2017 | Schlipf | F01N 3/2013 |
| 2017/0226907 A1 | * | 8/2017 | Crawford | F01N 3/2828 |
| 2018/0266349 A1 | | 11/2018 | Almkvist | |

FOREIGN PATENT DOCUMENTS

DE    4225274 A1    2/1994

* cited by examiner

*Primary Examiner* — Jelitza M Perez
(74) *Attorney, Agent, or Firm* — Carlson, Gaskey & Olds, P.C.

(57) ABSTRACT

An apparatus includes a housing and at least one substrate enclosed within the housing and extending along an axis. The substrate includes at least one internal open area that is of a predetermined size and at a predetermined location within the substrate. At least one heater is configured to heat the at least one substrate by directing heat into the at least one internal open area.

25 Claims, 4 Drawing Sheets

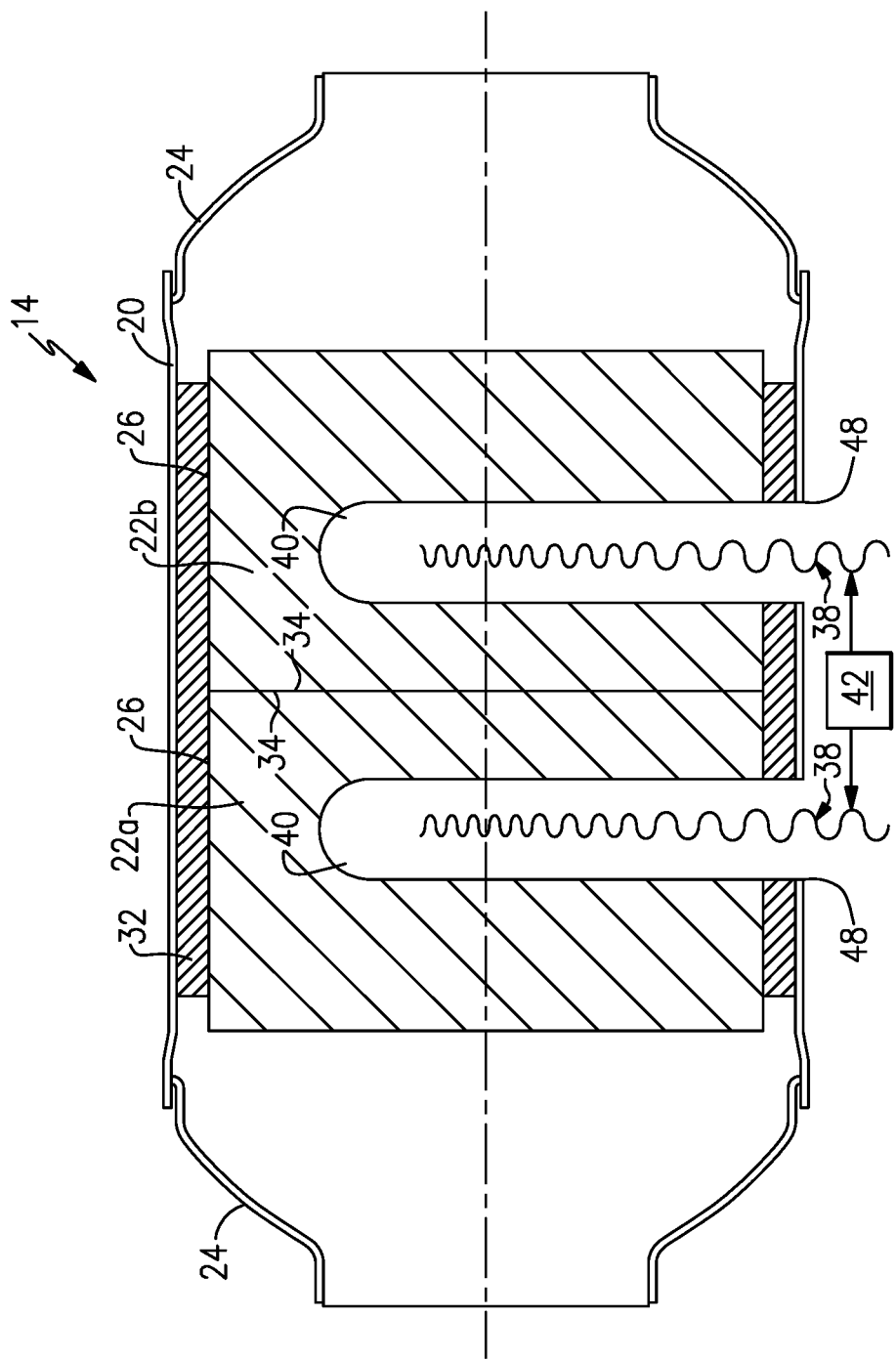

EXHAUST COMPONENT ASSEMBLY WITH HEATING ELEMENT AND CARVED SUBSTRATE

BACKGROUND OF THE INVENTION

Vehicle exhaust systems typically utilize catalytic purification substrates to convert NOx, CO, and hydrocarbons into $N_2$, $CO_2$ and $H_2O$. However, these substrates are most effective when catalytic material of the substrate is at a minimum temperature. There are efficiency issues at an initial cold start of a vehicle, when an engine is cold and exhaust gases produced by the engine are at an insufficient temperature to heat the catalytic substrate to a sufficient temperature for the substrates to become active.

To address cold start issues, different materials and/or coatings have been proposed for the substrates. Further, it has been proposed to pre-heat the substrate. However, the known configurations are not fully satisfactory and/or cost effective. For example, heat is generally poorly distributed within the substrate material, which results in an uneven heating of the catalytic member or the insufficient overall temperature is not high enough. This provides for downgraded performance levels even after time and effort has been spent for the pre-heating process.

SUMMARY OF THE INVENTION

In one exemplary embodiment, an apparatus includes a housing and at least one substrate enclosed within the housing and extending along an axis. The substrate includes at least one internal open area that is of a predetermined size and at a predetermined location within the substrate. At least one heater is configured to heat the at least one substrate by directing heat into the at least one internal open area.

In another embodiment according to the previous embodiment, the at least one heater comprises a heating element that positioned external to the housing.

In another embodiment according to any of the previous embodiments, the housing includes an opening in communication with the heating element such that air is heated externally by the heating element and subsequently directed through the opening and into the internal open area.

In another embodiment according to any of the previous embodiments, the at least one heater comprises a heating element that is positioned within the at least one internal open area.

In another embodiment according to any of the previous embodiments, the at least one substrate comprises at least first and second substrates having end faces in direct abutting engagement with each other, and wherein each of the first and second substrates includes at least one internal open area.

In another embodiment according to any of the previous embodiments, an insulating mat surrounds both the first and second substrates.

In another embodiment according to any of the previous embodiments, the substrate has an outermost peripheral surface that surrounds the axis, and wherein the at least one internal open area extends from the outermost peripheral surface inward toward the axis.

In another embodiment according to any of the previous embodiments, the at least one internal open area extends from the outermost peripheral surface inward to intersect and extend beyond the axis.

In another embodiment according to any of the previous embodiments, the at least one internal open area extends from the outermost peripheral surface inward toward the axis and splits into a plurality of open branches.

In another embodiment according to any of the previous embodiments, the at least one internal open area comprises a plurality of internal open areas with each internal open area being discrete from each other and extending from the outermost peripheral surface inward toward the axis.

In another embodiment according to any of the previous embodiments, the at least one internal open area comprises a plurality of internal open areas with each internal open area extending from the outermost peripheral surface inward to intersect and extend beyond the axis.

In another embodiment according to any of the previous embodiments, the at least one internal open area comprises a linear path portion that extends from the outermost peripheral surface inward and transitions into an expanded open central area portion extending around the axis.

In another embodiment according to any of the previous embodiments, the at least one internal open area comprises a plurality of internal open areas, and wherein one internal open area extends inwardly from the outermost peripheral surface on one side of substrate and another internal open area extends inwardly from the outermost peripheral surface from an opposite side of the substrate, or wherein the at least one internal open area comprises a plurality of discrete internal open areas that are circumferentially spaced apart from each other about the axis.

In another embodiment according to any of the previous embodiments, a control system is configured to activate the at least one heater to heat the substrate before an engine is started.

In another exemplary embodiment, an apparatus includes a housing and at least one catalyst substrate enclosed within the housing and extending along an axis. The substrate includes at least one internal open area that is of a predetermined size and at a predetermined location within the substrate. The substrate has an outermost peripheral surface that surrounds the axis, and wherein the at least one internal open area extends from the outermost peripheral surface inward toward the axis. The at least one heater is configured to heat the at least one substrate by directing heat into the at least one internal open area, wherein the at least one heater comprises a heating element that positioned external to the housing or comprises a heating element that is positioned within the at least one internal open area. A control system is configured to activate the at least one heater to heat the substrate before an engine is started.

In another embodiment according to any of the previous embodiments, the at least one internal open area comprises a plurality of discrete internal open areas that are spaced apart from each about a perimeter of the substrate.

In another embodiment according to any of the previous embodiments, the at least one internal open area is free from sensors.

In another exemplary embodiment, a method includes providing at least one catalyst substrate enclosed within a housing and having a body extending along an axis, forming at least one internal open area within the body that is of a predetermined size and at a predetermined location within the body, and activating at least one heater prior to starting an engine to heat the at least one substrate by directing heat into the at least one internal open area.

In another embodiment according to any of the previous embodiments, the method includes activating the at least one heater for a predetermined amount of time or until a desired temperature level of the body is achieved.

In another embodiment according to any of the previous embodiments, the method includes evenly distributing heat within the body by forming the at least one internal open area as a plurality of discrete internal open areas that are spaced apart from each about a perimeter of the body.

These and other features may be best understood from the following drawings and specification.

BRIEF DESCRIPTION OF THE DRAWINGS

FIG. 6 shows an example of an exhaust aftertreatment component that is comprised of multiple substrates.

DETAILED DESCRIPTION

Figure 1:
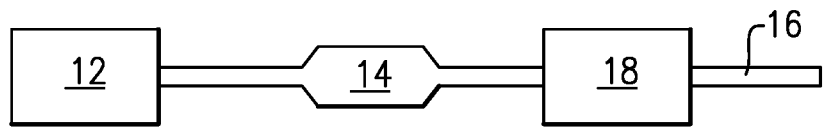
FIG. 1 is a schematic view of a vehicle exhaust system incorporating the subject invention.

FIG. 1 shows a schematic representation of a vehicle exhaust system 10 that conducts hot exhaust gases generated by an engine 12 through various exhaust components to reduce emission and control noise as known. In one example configuration, the exhaust system 10 includes at least one exhaust aftertreatment component 14 that is positioned downstream of the engine 12. In one example, the at least one exhaust aftertreatment component 14 comprises one or more catalytic purification substrates that convert NOx, CO, and hydrocarbons into $N_2$, $CO_2$ and $H_2O$ as known, before exhaust gases exit the system 10 via a tailpipe 16. The vehicle exhaust system 10 may also include additional exhaust components and aftertreatment components upstream and/or downstream of the exhaust aftertreatment component 14. In one example, a muffler 18 is positioned downstream of the exhaust aftertreatment component 14 and is used for acoustic treatment and/or noise reduction.

Figure 2A:
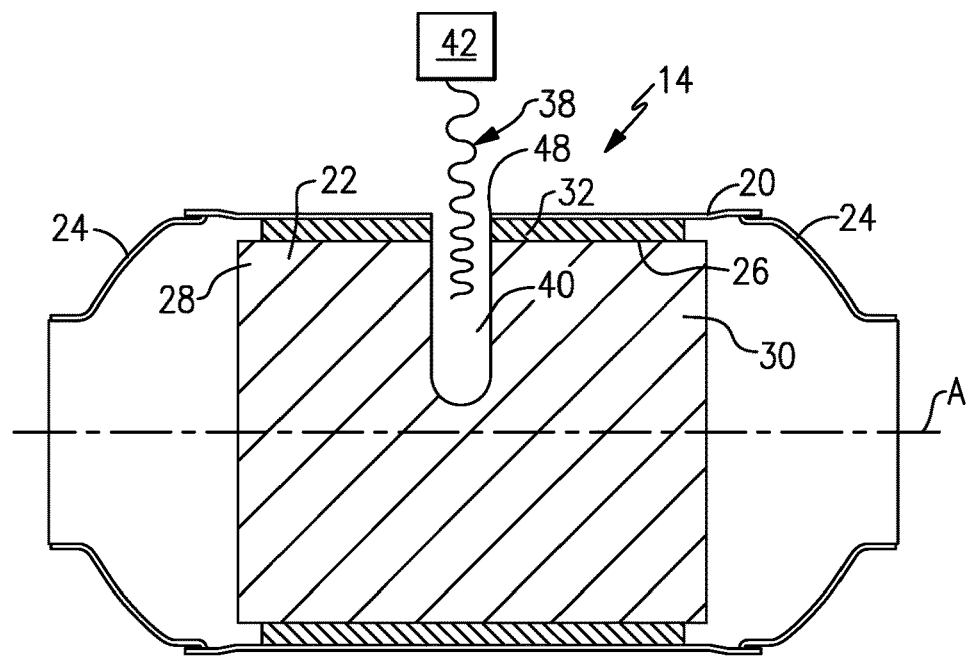
FIG. 2A is one example of an exhaust aftertreatment component as used in the system of FIG. 1.

As shown in the example of FIG. 2A, the exhaust aftertreatment component 14 comprises a housing 20 and at least one substrate 22 enclosed within the housing 20 that extends along an axis A. The substrate 22 has an outermost peripheral surface 26 that surrounds the axis A and extends between a first end 28 and a second end 30. An insulating mat 32 surrounds the outermost peripheral surface 26 of the substrate 22 within the housing 20. In one example, the mat 32 extends along a substantial length of the substrate 22 but leaves portions at the first 28 and second 30 ends exposed, e.g., approximately ⅞ of the length is covered. In one example, cones 24 are connected at inlet and outlet ends of the housing 20. The cone 24 at the inlet receives exhaust gases from the engine 12 and the cone 24 at the outlet directs gases exiting the substrate 22 to downstream exhaust system components. Optionally, the housing 20 can be comprised of a single piece housing with integrally formed cone portions at the inlet and outlet. Optionally, the exhaust aftertreatment component 14 can have different inlet and outlet cones.

FIG. 6 shows an example where the at least one substrate 22 comprises at least first 22a and second 22b substrates that have end faces 34 that are in direct abutting contact with each other. In this example, a single insulating mat 32 surrounds both substrates 22a, 22b. Optionally, each substrate could be surrounded by its own mat.

During cold start conditions, exhaust gases initially produced by the engine 12 are at an insufficient temperature to heat the substrate 22 to a sufficient temperature for the substrates 22 to become active and efficiently convert NOx, CO, and hydrocarbons into $N_2$, $CO_2$ and $H_2O$. Or, based on the properties of the substrates 22, the heat transfer from the gas to the substrate 22 is insufficient to bring the substrate 22 to the target temperature to start converting harmful gases generated by the engine 12. In one disclosed example, a cold start system heats the substrate(s) 22, 22a, 22b prior to the engine 12 starting such that the substrate is at an active temperature level when the vehicle is started. Additionally, the cold start system can provide more heat to the substrate 22 while the engine 12 is running during the cold start phase.

As shown in FIG. 2A, the substrate 22 includes at least one internal open area 40 that is of a predetermined size and at a predetermined location within the substrate 22. The cold start system uses this customized open area 40 in combination with at least one heater 42 that is configured to heat the substrate 22 by directing heated air 38 into the open area 40.

Figure 2B:
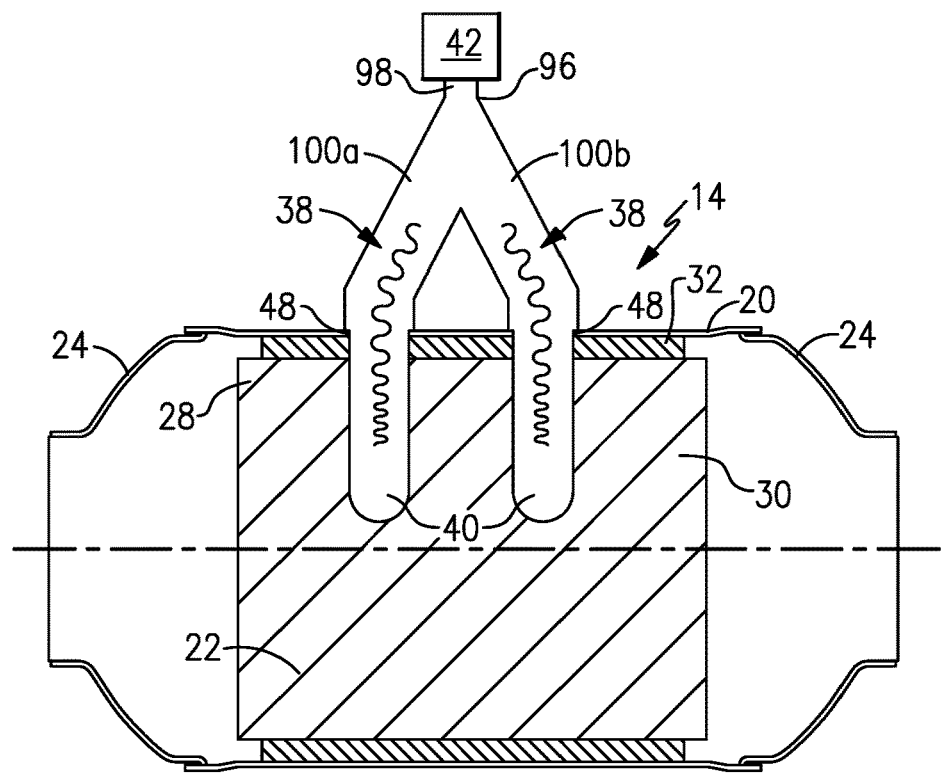
FIG. 2B is another example of an exhaust aftertreatment component as used in the system of FIG. 1, and which comprises a dual cavity configuration.

FIG. 2B shows an example where the substrate 22 includes two customized open areas 40. In this example, a Y or U-shaped connector 96 directs heat from the heater 42 into each open area 40. A base leg 98 of the connector 96 is coupled to the heater 42 and first and second Y-legs 100a, 100b are associated with external openings 48 in the housing 20 that lead to each of the open areas 40. Additional open areas 40 could also be provided within the substrate 22 as needed.

Figure 3:
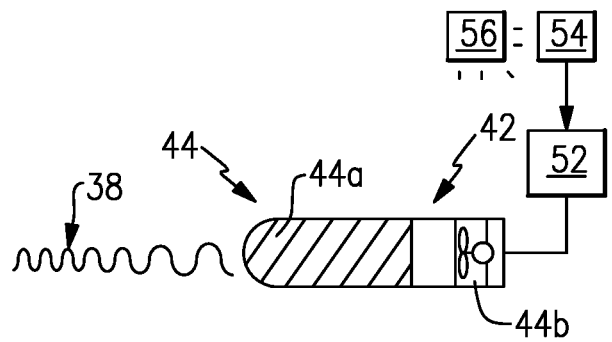
FIG. 3 is a schematic view of one example of an external heater as used with the exhaust aftertreatment component of FIG. 2A or B.

In one example shown in FIG. 3, the heater 42 comprises a heating element 44 that is positioned external to the housing 20. The heating element 44 can be simply associated with a heat gun 46 or hair dryer, for example. The heating element 44 is heated and the air that flows around the heating element 44 is also heated and is directed or guided into the open area 40. One heat gun 46 can be used to direct heated air 38 into multiple open areas 40, or additional heat guns 46 or heating elements 44 can be used to heat one or more of the open areas 40. In one example shown in FIG. 3, the heating element 44 is a resistance wire or electrode 44a with a fan and motor 44b that blows air over the electrode 44a such that the air can be heated. The motor 44b can be located in the cavity 40, directly connected to the housing 20, or located externally with some type of connection.

In one example, the housing 20 includes at least one external opening 48 through which the heated air is directed. The heater 42 directs the heated air 38 through each opening 48 to facilitate heating the substrate 22 via the open area 40. If the substrate 22 has more than one open area 40, the housing 20 can include additional openings 48. Further, if there is more than one substrate, such as that shown in FIG. 6, each substrate 22a, 22b can be aligned with its own external opening 48 in the housing 20. In all examples, the openings 48 are in direct contact with the heater 42 such that air is heated externally by the heating element 44 and subsequently directed through the openings 48 and into the associated internal open areas 40.

Figure 4:
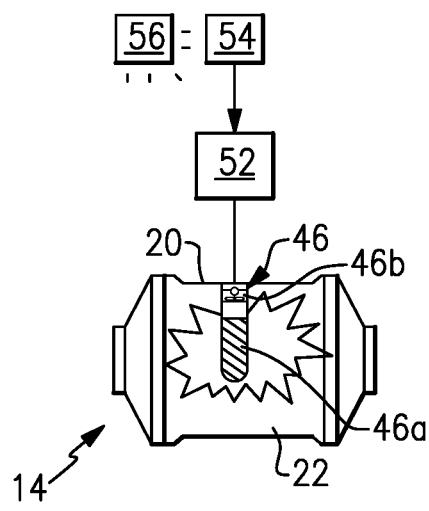
FIG. 4 is a schematic view of one example of an internal heater as used with the exhaust aftertreatment component of FIG. 2A or B.

In another example shown in FIG. 4, the heater 42 comprises a heating element 46 that is positioned within the at least one internal open area 40. The heating element 46 can comprise an electrode or resistance wire 46a, for example, that is activated to heat the air around the element 46 that is provided by a fan and motor 46b.

In each example, a control system 52 is configured to activate the one or more heaters 42 to heat the substrate 22, 22a, 22b before the engine 12 is started. The control system 52 can include a dedicated cold start system controller or can be integrated into the engine controller or any other vehicle system controller. The control system 52 activates the heater 42 for a predetermined amount of time prior to starting the engine 12 or until a desired temperature level of the substrate 22 is achieved. Temperature sensors 54 can be used to monitor temperature of the heated air 38 and/or of the substrate 22, 22a, 22b.

The control system 52 can activate the heater 42 in response to a wireless signal generated from a key fob 56 by pressing a button, for example. Optionally, the control system 52 can activate the heater 42 in response to the key fob 56 being in close proximity, i.e. a predetermined distance, relative to the vehicle, or by touching a handle or other predesignated surface on the vehicle.

The substrates 22, 22a, 22b can have various cross-sectional shapes including round, oval, polygonal, etc. Further, the shape and size of the open areas 40 can vary as needed to provide configurations that evenly distribute heat throughout the substrate 22, 22a, 22b. In each example, the internal open area 40 extends from the outermost peripheral surface 26 of the substrate 22 inward toward the axis A. In one example, each open area 40 is free from sensor components such that the heated air can be evenly distributed without interruption from non-heating components.

Figure 5:
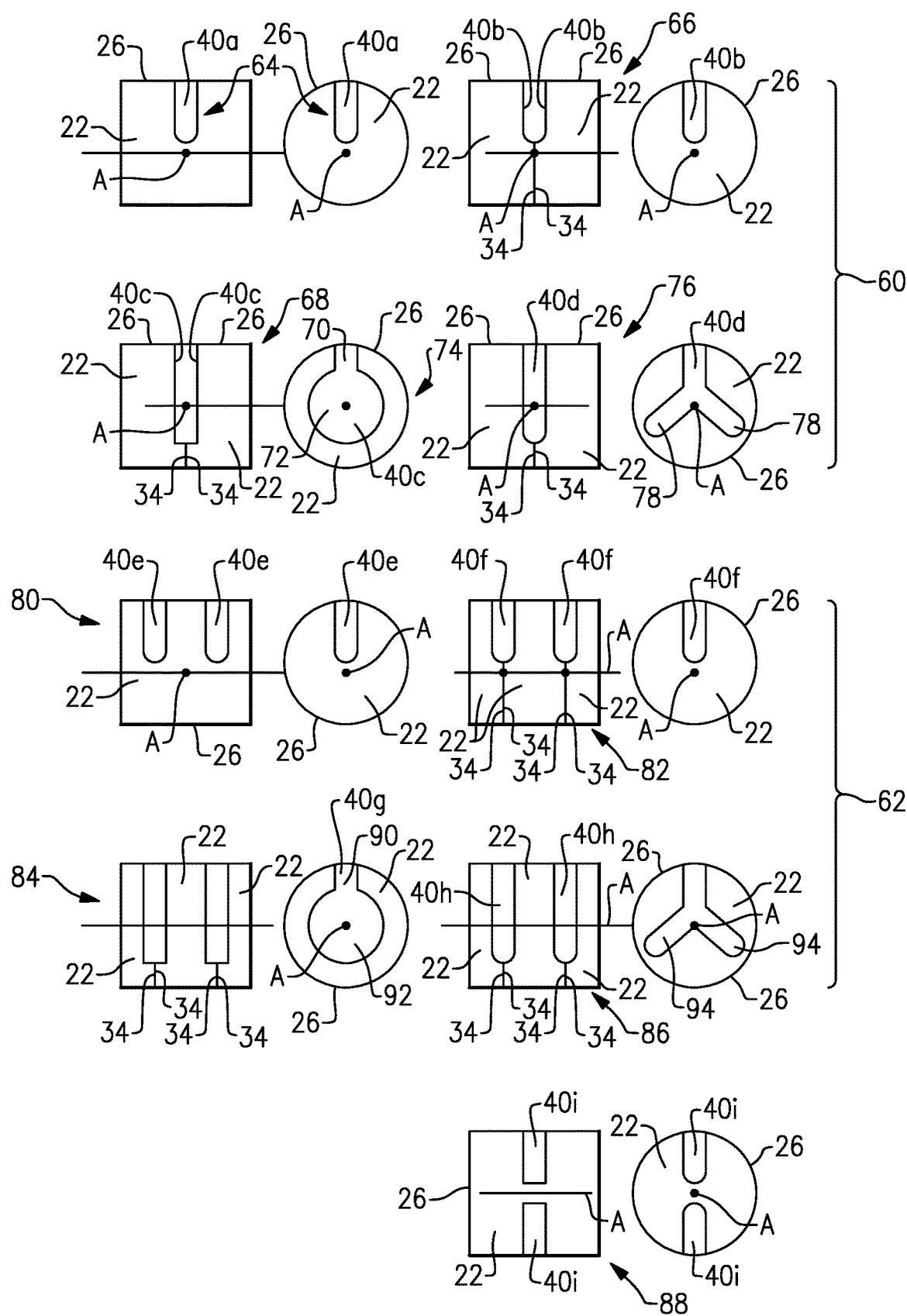
FIG. 5 shows various examples of possible substrate sections and configurations from the exhaust aftertreatment component of FIG. 2A or B.

FIG. 5 shows examples of single substrate configurations. FIG. 5 also shows different possible configurations for having two substrates 22 directly abutted against each other (see 60) and for having three substrates 22 directly abutted against each other (see 62). In one example, each substrate 22 includes a single internal open area 40a that extends inward from the outermost peripheral surface 26 to terminate before intersecting the axis A. The single internal open area 40a, in one example for a single substrate 22 configuration indicated at 64, comprises a linear path portion that extends in an inward direction toward the axis A.

In a two substrate configuration shown at 66, each substrate 22 includes a single internal open area 40b that extends inward from the outermost peripheral surface 26 to terminate before intersecting the axis A. Each open area 40b comprises a linear path portion that extends in a radially inward direction and directly faces the corresponding opening 40b in the end face 34 of the abutting substrate 22.

In another two substrate configuration shown at 68, the internal open area 40c extends from the outermost peripheral surface 26 inward to intersect and extend beyond the axis A. Each open area 40c comprises a linear path portion that extends in an inward direction and directly faces the corresponding opening 40c in the end face 34 of the abutting substrate 22. In a further example, a linear path portion 70 transitions into an expanded open central area portion 72 surrounding the axis A as indicated at 74.

In another two substrate configuration shown at 76, the internal open area 40d extends from the outermost peripheral surface 26 inward toward the axis A and splits into a plurality of open branches 78.

In a single substrate example shown at 80, the single substrate 22 includes a plurality of internal open areas 40e. These areas 40e are discrete from each other and are axially spaced apart from each other. Further, the open areas 40e extend inward from the outermost peripheral surface 26 to terminate before intersecting the axis A. The internal open areas 40e comprise a linear path portion that extends in an inward direction.

In a three substrate configuration shown at 82, the substrates 22 include open areas 40f that comprise a linear path portion that extends from the outermost peripheral surface 26 in an inward direction at each of the abutting end faces 34.

In another three substrate configuration shown at 84, a plurality of internal open areas 40g are discrete from each other and extend from the outermost peripheral surface 26 inward to intersect and extend beyond the axis A. In a further example, a linear path portion 90 of each open area 40g transitions into an expanded open central area portion 92 surrounding the axis A.

In another three substrate configuration shown at 86, a plurality of internal open areas 40h are discrete from each other and extend from the outermost peripheral surface 26 inward to intersect and extend beyond the axis A. In a further example, each open area 40h splits into a plurality of branches 94.

In another single substrate configuration, open areas 40i extend inwardly from opposing sides of the substrate 22 as indicated at 88. Optionally, a plurality of internal open areas 40a could comprise discrete internal open areas 40i that are circumferentially spaced apart from each other about the axis A.

Each of the internal open areas 40 is an intentionally carved out customized portion that is configured to quickly and evenly distribute heated air throughout the substrate 22. External or internal heating elements are activated prior to the engine 12 starting to heat the air and direct the air into the open areas 40. This allows the substrate 22 to reach the desired activation temperature before the vehicle is operational, which makes the exhaust system significantly more efficient. The heated air can also be continually added to the substrate after start-up for a desired amount of time if needed to maintain the desired operating efficiency.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An apparatus comprising:
    a housing including at least one housing opening;
    at least one substrate enclosed within the housing and extending along an axis, and wherein the at least one substrate includes at least one internal open area that is of a predetermined size and at a predetermined location within the at least one substrate, and wherein the at least one internal open area is open to the at least one housing opening;
    an insulating mat that surrounds an outermost peripheral surface of the at least one substrate, the insulating mat having at least one mat opening that is open to the at least one internal open area and that is aligned with the at least one housing opening;
    at least one heater that is configured to heat the at least one substrate by directing heat into the at least one internal open area; and
    wherein the at least one heater includes at least one fan and motor that are associated with a heating element.
2. An apparatus comprising:
    a housing including at least one housing opening;

at least one substrate enclosed within the housing and extending along an axis, and wherein the at least one substrate includes at least one internal open area that is of a predetermined size and at a predetermined location within the at least one substrate, and wherein the at least one internal open area is open to the at least one housing opening;
an insulating mat that surrounds an outermost peripheral surface of the at least one substrate, the insulating mat having at least one mat opening that is aligned with the at least one housing opening; and
at least one heater that is configured to heat the at least one substrate by directing heat into the at least one internal open area, wherein the at least one heater comprises a heating element that is positioned external to the housing.

3. The apparatus according to claim 2, wherein the at least one housing opening is in communication with the heating element such that air is heated externally by the heating element and subsequently directed through the at least one housing opening and the at least one mat opening and then into the internal open area.

4. The apparatus according to claim 1, wherein the at least one heater comprises a heating element that is inserted through the at least one housing and mat openings and is positioned within the at least one internal open area.

5. The apparatus according to claim 1, wherein the at least one substrate comprises at least first and second substrates having end faces in direct abutting engagement with each other, and wherein each of the first and second substrates includes at least one internal open area.

6. The apparatus according to claim 5, wherein the insulating mat surrounds both the first and second substrates, and wherein the first substrate includes at least one first internal open area formed within the end face and that faces at least one second internal open area formed within the end face of the second substrate.

7. The apparatus according to claim 1, wherein the outermost peripheral surface surrounds the axis, and wherein the at least one internal open area extends from the outermost peripheral surface radially inward toward the axis.

8. The apparatus according to claim 7, wherein the at least one internal open area extends from one side of the outermost peripheral surface inward to intersect and extend beyond the axis and terminates before reaching an opposite side of the outermost peripheral surface.

9. The apparatus according to claim 7, wherein the at least one internal open area extends from the outermost peripheral surface inward toward the axis and splits into a plurality of open branches.

10. The apparatus according to claim 7, wherein the at least one internal open area comprises a plurality of internal open areas with each internal open area being discrete from each other and extending from the outermost peripheral surface inward toward the axis.

11. The apparatus according to claim 7, wherein the at least one internal open area comprises a plurality of internal open areas with each internal open area extending from one side of the outermost peripheral surface inward to intersect and extend beyond the axis and terminating before reaching an opposite side of the outermost peripheral surface.

12. The apparatus according to claim 1, wherein the at least one internal open area comprises a liner path portion that extends from the outermost peripheral surface inward and transitions into an expanded open central area portion extending around the axis.

13. The apparatus according to claim 7, wherein the at least one internal open area comprises a plurality of internal open areas, and wherein a first internal open area extends inwardly from the outermost peripheral surface on one side of the at least one substrate and terminates before reaching an opposite side of the at least one substrate and wherein a second internal open area extends inwardly from the outermost peripheral surface on the opposite side of the at least one substrate and terminates before reaching the one side of the at least one substrate, or
wherein the at least one internal open area comprises a plurality of discrete internal open areas that are circumferentially spaced apart from each other about the axis such that each discrete internal open area extends inwardly from the outermost peripheral surface on one side of the at least one substrate and terminates before reaching the opposite side of the at least one substrate.

14. The apparatus according to claim 1, including a control system configured to activate the at least one heater to heat the substrate before an engine is started.

15. The apparatus according to claim 1, wherein the outermost peripheral surface of the at least one substrate extends between a first substrate end and a second substrate end, and wherein the insulating mat extends along a substantial length of the at least one substrate but leaves portions of the outermost peripheral surface at the first and second substrate ends exposed.

16. The apparatus according to claim 1, wherein the outermost peripheral surface of the at least one substrate extends between an upstream end face and a downstream end face, and wherein the at least one internal open area is axially spaced from the upstream and downstream end faces, and wherein the at least one internal open area extends radially inwardly from one side of the outermost peripheral surface and does not cross the axis.

17. An apparatus comprising:
a housing including at least one housing opening;
at least one catalyst substrate enclosed within the housing and extending along an axis, and wherein the at least one catalyst substrate includes at least one internal open area that is of a predetermined size and at a predetermined location within the at least one catalyst substrate, and wherein the at least one catalyst substrate has an outermost peripheral surface that surrounds the axis, and wherein the at least one internal open area is open to the at least one housing opening and extends from the outermost peripheral surface inward toward the axis;
an insulating mat that surrounds the outermost peripheral surface of the at least one catalyst substrate, the insulating mat having at least one mat opening that is open to the at least one internal open area and that is aligned with the at least one housing opening;
at least one heater that is configured to heat the at least one catalyst substrate by directing heat into the at least one internal open area, wherein the at least one heater comprises:
a heating element that is positioned external to the housing such that air is heated externally by the heating element and is subsequently directed through the at least one housing opening and the at least one mat opening and then into the at least one internal open area, or
a heating element that is inserted through the at least one housing and mat openings and is positioned within the at least one internal open area;

a control system configured to activate the at least one heater to heat the at least one catalyst substrate before an engine is started; and wherein the at least one internal open area is free from sensors.

18. The apparatus according to claim 17, wherein the at least one internal open area comprises a plurality of discrete internal open areas that are spaced apart from each about a perimeter of the at least one catalyst substrate.

19. The apparatus according to claim 17, wherein the outermost peripheral surface of the at least one catalyst substrate extends between a first substrate end and a second substrate end, and wherein the insulating mat extends along a substantial length of the at least one catalyst substrate but leaves portions of the outermost peripheral surface at the first and second substrate ends exposed.

20. The apparatus according to claim 17, wherein the outermost peripheral surface of the at least one catalyst substrate extends between an upstream end face and a downstream end face, and wherein the at least one internal open area is axially spaced from the upstream and downstream end faces, and wherein the at least one internal open area extends radially inwardly from one side of the outermost peripheral surface and does not cross the axis.

21. The apparatus according to claim 17, wherein the at least one catalyst substrate comprises at least first and second substrates having end faces in direct abutting engagement with each other, and wherein the first substrate includes at least one first internal open area formed within the end face and that faces at least one second internal open area formed within the end face of the second substrate.

22. The apparatus according to claim 17, wherein the at least one heater includes at least one fan and motor that are associated with the heating element.

23. An apparatus comprising:
a housing;
at least one substrate enclosed within the housing and extending along an axis, the at least one substrate having an outermost peripheral surface that extends between an upstream end face and a downstream end face, and wherein the at least one substrate includes at least one internal open area that is of a predetermined size and at a predetermined location within the at least one substrate, and wherein the at least one internal open area is axially spaced from the upstream and downstream end faces, and wherein the at least one internal open area extends radially inwardly from one side of the outermost peripheral surface and terminates before reaching an opposite side of the outermost peripheral surface; and at least one heater that is configured to heat the at least one substrate by directing heat into the at least one internal open area, and wherein the at least one heater includes at least one fan and motor that are associated with a heating element.

24. The apparatus according to claim 23, wherein the housing includes at least one housing opening that is open to the at least one internal open area, and including an insulating mat that surrounds the outermost peripheral surface of the at least one substrate, the insulating mat having at least one mat opening that is open to the at least one internal open area and that is aligned with the at least one housing opening.

25. The apparatus according to claim 24, wherein
the heating element is positioned external to the housing such that air is heated externally by the heating element and is subsequently directed through the at least one housing opening and the at least one mat opening and then into the at least one internal open area, or the heating element is inserted through the at least one housing and mat openings and is positioned within the at least one internal open area, and a control system configured to activate the at least one heater to heat the at least one substrate before an engine is started.

* * * * *